United States Patent
Murata et al.

(10) Patent No.: US 11,519,390 B2
(45) Date of Patent: Dec. 6, 2022

(54) WIND TURBINE BLADE INCLUDING LEADING EDGE PROTECTOR AND WIND TURBINE INCLUDING THE WIND TURBINE BLADE

(71) Applicant: MITSUBISHI HEAVY INDUSTRIES, LTD., Tokyo (JP)

(72) Inventors: Naoto Murata, Tokyo (JP); Syusaku Yamamoto, Tokyo (JP); Yoichiro Tsumura, Tokyo (JP); Tatsufumi Aoi, Tokyo (JP); Akio Ikeda, Tokyo (JP); Nobuyuki Kamihara, Tokyo (JP); Takehiro Naka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/314,352

(22) Filed: May 7, 2021

(65) Prior Publication Data
US 2021/0372374 A1    Dec. 2, 2021

(30) Foreign Application Priority Data
Jun. 1, 2020    (JP) .............................. JP2020-095606

(51) Int. Cl.
*F03D 80/30*    (2016.01)
*F03D 1/06*    (2006.01)
(52) U.S. Cl.
CPC .......... *F03D 80/30* (2016.05); *F03D 1/0675* (2013.01); *F05B 2230/90* (2013.01); *F05B 2240/303* (2020.08)

(58) Field of Classification Search
CPC .......... F03D 80/30; F03D 80/40; B64D 45/02
See application file for complete search history.

(56) References Cited

U.S. PATENT DOCUMENTS

| | | | |
|---|---|---|---|
| 7,554,785 B2 * | 6/2009 | Hawley ................. | B64D 45/02 361/112 |
| 7,896,616 B2 * | 3/2011 | Livingston .............. | F03D 80/30 416/224 |
| 9,404,172 B2 * | 8/2016 | Clavette ................ | F04D 29/324 |
| 9,689,377 B2 * | 6/2017 | Klein ..................... | F03D 80/40 |
| 10,815,002 B2 * | 10/2020 | Ding ....................... | B64C 3/28 |

(Continued)

FOREIGN PATENT DOCUMENTS

| EP | 2 623 773 | 8/2013 |
|---|---|---|
| EP | 3447284 A1 * | 2/2019 |

(Continued)

OTHER PUBLICATIONS

English translation of JP2012246815A (Year: 2012).*

(Continued)

*Primary Examiner* — Eric J Zamora Alvarez
*Assistant Examiner* — Wesley Le Fisher
(74) *Attorney, Agent, or Firm* — Wenderoth, Lind & Ponack, L.L.P.

(57) ABSTRACT

A wind turbine blade includes a blade main body and a leading edge protector. The leading edge protector includes a conductive material and covers a leading edge of the blade main body. The leading edge protector is also electrically connected to a down conductor disposed in a hollow space enclosed by a skin in the blade main body or a conductive mesh member provided along an outer surface of the skin.

9 Claims, 8 Drawing Sheets

(56) References Cited

U.S. PATENT DOCUMENTS

| | | | | |
|---|---|---|---|---|
| 10,844,843 B2* | 11/2020 | Fujioka | ............... | F03D 9/25 |
| 2010/0047070 A1* | 2/2010 | Slot | ............... | F03D 1/065 |
| | | | | 416/223 R |
| 2011/0142678 A1* | 6/2011 | Santiago | ............... | F03D 1/0675 |
| | | | | 416/241 R |
| 2011/0182731 A1 | 7/2011 | Naka et al. | | |
| 2016/0348643 A1* | 12/2016 | Fujioka | ............... | F03D 9/25 |
| 2020/0291926 A1* | 9/2020 | Leong | ............... | F03D 80/30 |
| 2021/0332788 A1* | 10/2021 | Sato | ............... | F03D 80/30 |

FOREIGN PATENT DOCUMENTS

| | | | | | |
|---|---|---|---|---|---|
| JP | 2012246815 A | * | 12/2012 | | |
| WO | 2013/007267 | | 1/2013 | | |
| WO | WO-2013007267 A1 | * | 1/2013 | ........... | F03D 1/0675 |
| WO | 2018/157929 | | 9/2018 | | |
| WO | WO-2018157929 A1 | * | 9/2018 | | |
| WO | 2018/219524 | | 12/2018 | | |

OTHER PUBLICATIONS

English translation of EP3447284A1 (Year: 2019).*
English translation of WO2018157929A1 (Year: 2018).*
Extended European SearchReport dated Oct. 22, 2021 in corresponding European Patent Application No. 21173850.5.

* cited by examiner

WIND TURBINE BLADE INCLUDING LEADING EDGE PROTECTOR AND WIND TURBINE INCLUDING THE WIND TURBINE BLADE

CROSS-REFERENCE TO RELATED APPLICATIONS

This application claims the benefit of priority to Japanese Patent Application Number 2020-095606 filed on Jun. 1, 2020. The entire contents of the above-identified application are hereby incorporated by reference.

TECHNICAL FIELD

The disclosure relates to a wind turbine blade and a wind turbine including the wind turbine blade.

RELATED ART

In wind turbines used in, for example, wind power generation devices, raindrops, dust, and the like repeatedly collide against the leading edge of rotating wind turbine blades, thereby causing erosion damage. Recent years have seen increasing circumferential speed at the blade tip of wind turbine blades as the size of wind turbines increase, with the impact of erosion damage on the service life of wind turbines increasing.

In order to suppress such erosion damage, a protector is sometimes disposed at the leading edge of wind turbine blades, where erosion damage is prone to arise. For example, WO 2018/219524 discloses a technique for suppressing erosion damage by covering, with a shield member, the leading edge of wind turbine blades on the blade tip side, where the circumferential speed of the wind turbine blade is faster.

SUMMARY

A protector for suppressing erosion damage, such as the shield member of WO 2018/219524 above, covers the leading edge of the wind turbine blade and is subject to raindrops, dust, and the like in place of the blade main body, thereby preventing the blade main body from being subjected to erosion damage. Such protectors need to be replaced at an appropriate timing because they receive substantial damage by being subjected to raindrops, dust, and the like. Currently, conventional protectors are formed of a material such as urethane and must be replaced every few years, for example.

In addition, due to being located at high elevation, wind turbine blades included in wind turbines may be struck by lightning, meaning that good lightning resistance performance is required. If a protector disposed on the leading edge of a wind turbine blade does not have sufficient lightning resistance performance, the protector may be damaged when struck by lightning due to arc energy generated by the lightning or Joule heat flowing through the protector, and may even fall off in some cases.

At least one embodiment of the disclosure has been made in light of the foregoing circumstances. An object of the disclosure is to provide a wind turbine blade that effectively suppresses erosion damage from arising and that has excellent lightning resistance performance, as well as a wind turbine including the wind turbine blade.

A wind turbine blade according to at least one embodiment of the disclosure includes, in order to solve the above-described problems, a blade main body; and a leading edge protector including a conductive material, the leading edge protector covering a leading edge of the blade main body, and the leading edge protector being electrically connected to at least one of a down conductor disposed in a hollow space enclosed by a skin in the blade main body and a conductive mesh member provided along an outer surface of the skin.

A wind turbine according to at least one embodiment of the disclosure includes, in order to solve the above-described problems, the wind turbine blade according to at least one embodiment of the disclosure.

According to at least one embodiment of the disclosure, a wind turbine blade that effectively suppresses erosion damage from arising and that has excellent lightning resistance performance, as well as a wind turbine including the wind turbine blade, can be provided.

BRIEF DESCRIPTION OF DRAWINGS

The disclosure will be described with reference to the accompanying drawings, wherein like numbers reference like elements.

FIG. 6 is a schematic cross-sectional view taken along the line B-B in

FIG. 5.

DESCRIPTION OF EMBODIMENTS

Hereinafter, some embodiments of the disclosure will be described with reference to the accompanying drawings. It is intended, however, that unless particularly specified, dimensions, materials, shapes, relative positions and the like of components described in the embodiments shall be interpreted as illustrative only and not intended to limit the scope of the disclosure. For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance within a range in which it is possible to achieve the same function.

For instance, an expression of an equal state such as "same", "equal", "uniform" and the like shall not be construed as indicating only the state in which the feature is strictly equal, but also includes a state in which there is a tolerance or a difference within a range where it is possible to achieve the same function.

Further, for instance, an expression of a shape such as a rectangular shape, a cylindrical shape or the like shall not be construed as only the geometrically strict shape, but also includes a shape with unevenness, chamfered corners or the like within the range in which the same effect can be achieved.

On the other hand, an expression such as "comprise", "include", "have", "contain" and "constitute" are not intended to be exclusive of other constituent elements.

Figure 1:
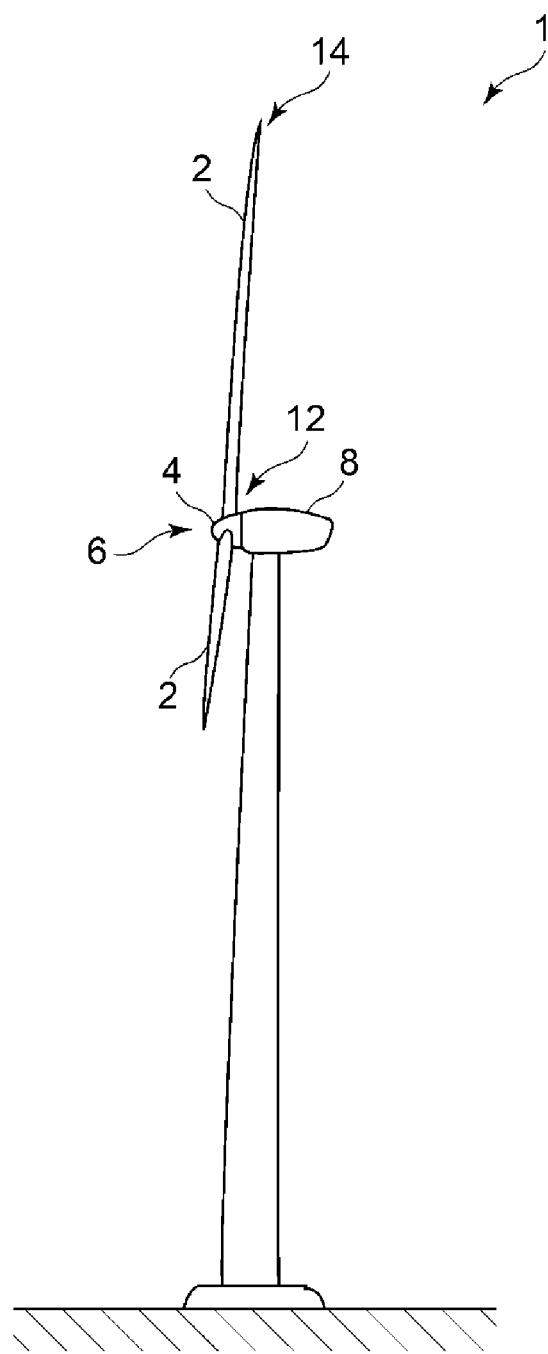
FIG. 1 is an overall configuration diagram schematically illustrating a wind turbine according to one embodiment.

First, the configuration of a wind turbine 1 according to at least one embodiment of the disclosure will be described. FIG. 1 is an overall configuration diagram schematically illustrating a wind turbine 1 according to one embodiment.

The wind turbine 1 includes at least one wind turbine blade 2. The wind turbine blade 2 is attached to a hub 4, thereby constituting together with the hub 4 a wind turbine rotor 6 rotatable around a rotor shaft. In the wind turbine rotor 6 of the wind turbine 1 illustrated in FIG. 1, three wind turbine blades 2 are attached at equal intervals around the rotor shaft with respect to the hub 4. Each wind turbine blade 2 has a blade root 12 coupled to the hub 4 and a blade tip 14 on a side opposite the blade root 12 in the blade longitudinal direction. The wind turbine rotor 6 is rotatably attached to a nacelle 8 that is pivotably provided on a tower 10. In the wind turbine 1 having such a configuration, when the wind hits the wind turbine blades 2, the wind turbine rotor 6 including the wind turbine blades 2 and the hub 4 rotates around the rotor shaft.

Note that the wind turbine 1 may be configured as a wind power generation device, for example. In this case, the nacelle 8 houses a power generator and a motive power transmission mechanism for transmitting the rotation of the wind turbine rotor 6 to the power generator. In the wind turbine 1, rotational energy transmitted from the wind turbine rotor 6 to the power generator by the motive power transmission mechanism is converted to electrical energy by the power generator.

Figure 2:
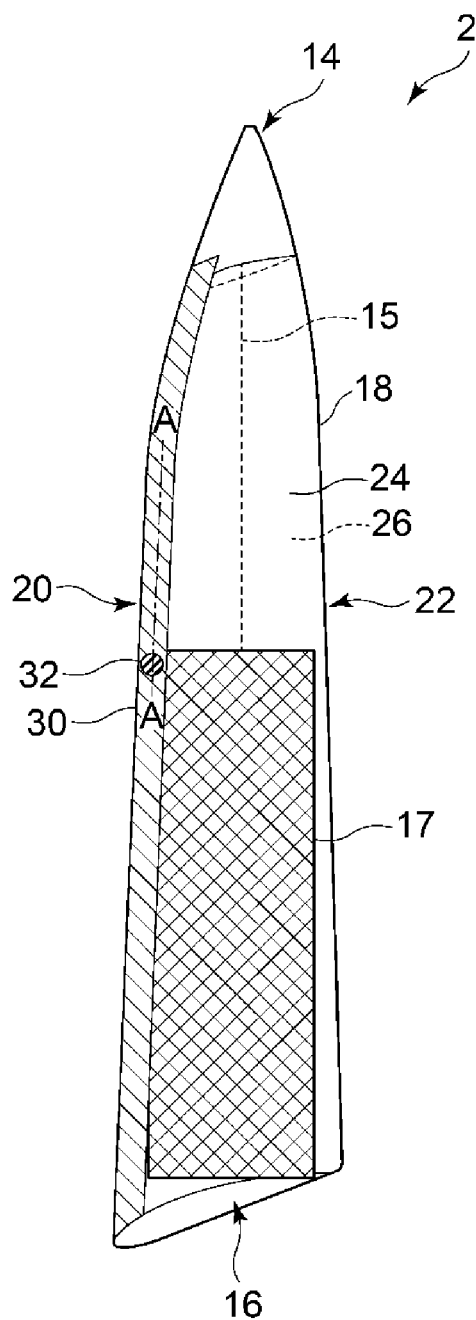
FIG. 2 is a perspective view illustrating a blade tip side of a wind turbine blade according to one embodiment.
Figure 3:
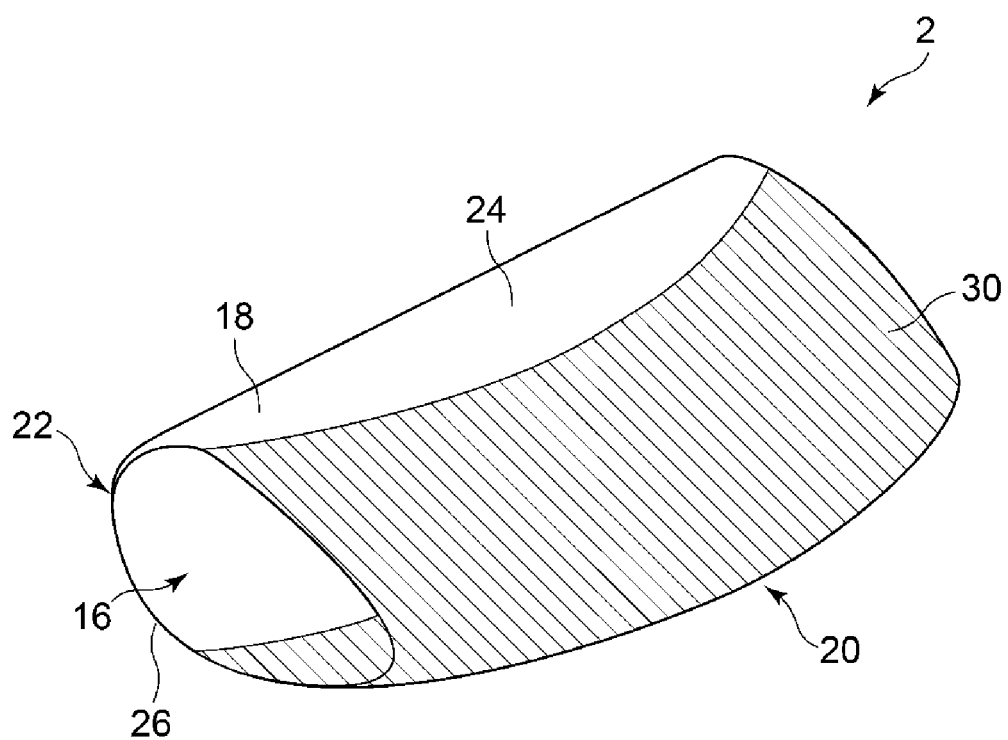
FIG. 3 is a perspective view illustrating a leading edge protector provided on the leading edge of FIG. 2.
Figure 4:
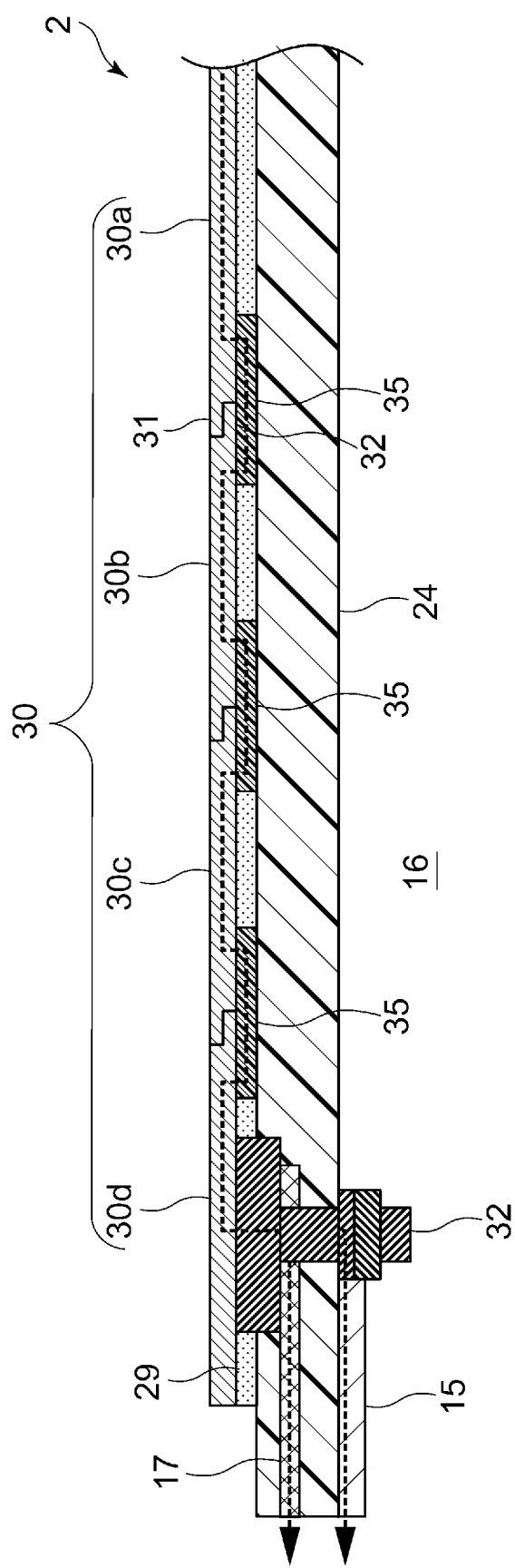
FIG. 4 is a cross-sectional view of a vicinity of a suction-side skin taken along the line A-A in FIG. 2.

FIG. 2 is a perspective view illustrating a blade tip 14 side of the wind turbine blade 2 according to one embodiment. FIG. 3 is a perspective view illustrating a leading edge protector 30 provided on a leading edge 20 of FIG. 2. FIG. 4 is a cross-sectional view of a vicinity of a suction-side skin 24 taken along the line A-A in FIG. 2.

The wind turbine blade 2 has a blade main body 18. The blade main body 18 extends from the blade root 12 toward the blade tip 14 along the blade longitudinal direction, and has a leading edge 20 provided on the front side in the blade cord direction and a trailing edge 22 provided on the rear side in the blade cord direction.

The blade main body 18 has a skin including a fiber reinforced plastic. For the fiber reinforced plastic that constitutes the skin, for example, glass fiber reinforced plastic (GFRP) and carbon fiber reinforced plastic (CFRP) can be used.

In the present embodiment, the blade main body 18 includes a suction-side skin 24 and a pressure-side skin 26 disposed so as to face each other. The suction-side skin 24 and the pressure-side skin 26 are connected to each other at the leading edge 20 and the trailing edge 22 of the blade main body 18, whereby a hollow space 16 enclosed by the skin is formed inside the blade main body 18.

Note that in the leading edge 20 and the trailing edge 22, the suction-side skin 24 and the pressure-side skin 26 are fixed to each other by being bonded with an adhesive, for example.

A down conductor 15 is disposed in the hollow space 16. The down conductor 15 includes a conductive material and constitutes at least part of the electrical path through which lightning current generated in the wind turbine blade 2 flows when the wind turbine 1 is struck by lightning. The down conductor 15 extends along the blade longitudinal direction inside the hollow space 16, with one end on the blade root 12 side being electrically connected to a grounding wire (not illustrated).

Note that the other end of the down conductor 15 may be electrically connected to a receptor (not illustrated) provided at the blade tip.

The blade main body 18 includes a conductive mesh member 17. The conductive mesh member 17 includes a conductive material and, together with the aforementioned down conductor 15, constitutes at least part of the electrical path through which the lightning current generated in the wind turbine blade 2 flows when the wind turbine 1 is struck by lightning. The conductive mesh member 17 is configured such that the conductive material has a mesh shape and is provided along the outer surface of the skin that constitutes the blade main body 18. Specifically, as illustrated in FIG. 4, the conductive mesh member 17 is embedded in the vicinity of the outer surface of the skin.

In the present embodiment, the conductive mesh member 17 is provided along the outer surface of the suction-side skin 24. As illustrated in FIG. 2, the conductive mesh member 17 has a substantially constant width along the blade cord direction, and is formed over a predetermined range from the blade root 12 toward the blade tip 14.

The wind turbine blade 2 includes a leading edge protector 30. The leading edge protector 30 is configured to cover the leading edge 20 of the blade main body 18, as illustrated in FIG. 3. Because the leading edge protector 30 is formed of a material having excellent erosion resistance performance, the leading edge protector 30 protects the leading edge 20 from raindrops, dust, and the like during operation of the wind turbine 1, thereby suppressing erosion damage.

Note that the leading edge protector 30 is attached to the outer surface of the suction-side skin 24 via a bonding layer 29, as illustrated in FIG. 4. The bonding layer 29 is formed by curing an acrylic or epoxy-based adhesive, for example.

The leading edge protector 30 also includes a conductive material. For the conductive material, copper alloys or metals having physical properties similar thereto can be used, for example. In this way, together with the aforementioned down conductor 15 and conductive mesh member 17, the leading edge protector 30 constitutes at least part of the electrical path through which the lightning current generated in the wind turbine blade 2 flows when the wind turbine 1 is struck by lightning. In this manner, with the leading edge protector 30 for preventing erosion damage to the blade main body 18 constituting part of the lightning resistant structure of the wind turbine blade 2, the lightning resistance performance of the wind turbine blade 2 can be improved.

In addition, as illustrated in FIG. 3, with the leading edge protector 30 covering the leading edge 20 over a wide area, the probability of lightning striking the leading edge protector 30 having lightning resistance performance can be increased. In this way, for example, the skin that constitutes the blade main body 18 can be effectively prevented from being damaged due to being subjected to lightning.

As illustrated in FIG. 2, the leading edge protector 30 is provided over a predetermined region on the blade tip 14 side of the leading edge 20 of the blade main body 18. Erosion damage is prone to occur on the blade tip 14 side of the leading edge 20 because the circumferential speed is faster. In addition, due to being located at a high elevation, the blade tip 14 side of the leading edge 20 is likely to be subjected to lightning. Therefore, by providing the leading edge protector 30 over the predetermined region, it is possible to effectively suppress erosion damage and improve lightning resistance performance.

The leading edge protector 30 is electrically connected to at least one of the down conductor 15 and the conductive mesh member 17. In the present embodiment, the leading edge protector 30 is electrically connected to both the down conductor 15 and the conductive mesh member 17. With this configuration, when the wind turbine blade 2 is struck by lightning, the lightning current generated in the leading edge protector 30 is directed to the down conductor 15 and the conductive mesh member 17, thereby achieving good lightning resistance performance.

In the blade main body 18, at least one receptor 32 that serves as a lightning strike target is provided. In the present embodiment, as illustrated in FIG. 2, the receptor is disposed in a region of the suction-side skin 24 where the conductive mesh member 17 and the leading edge protector 30 overlap when viewed from a direction perpendicular to the outer surface. The receptor 32 is provided so as to extend from the outer surface along the thickness direction in the skin that constitutes the blade main body 18. As illustrated in FIG. 4, the receptor 32 is provided so as to pass through the suction-side skin 24 of the skin that constitutes the blade main body 18.

The leading edge protector 30 is electrically connected to at least one of the down conductor 15 and the conductive mesh member 17 via the receptor 32. The leading edge protector 30 of the present embodiment is electrically connected to both the down conductor 15 and the conductive mesh member 17. Specifically, as illustrated in FIG. 4, the leading edge protector 30 disposed on the outer surface side of the suction-side skin 24 is electrically connected to the conductive mesh member 17, which is embedded in the suction-side skin 24, via the receptor 32 that passes through the suction-side skin 24, and is electrically connected to the down conductor 15 disposed on the inside (hollow space 16) of the suction-side skin 24.

In this manner, the receptor 32 extending along the thickness direction of the skin makes it possible to electrically connect, in an efficient layout, the leading edge protector 30 to the down conductor 15 or the conductive mesh member 17 provided at different positions along the thickness direction of the skin.

The leading edge protector 30 may include a plurality of protector members 30a, 30b, 30c, . . . . As illustrated in FIG. 4, the plurality of protector members 30a, 30b, 30c, . . . are constructed by dividing the leading edge protector 30 having a plate shape into a plurality of sections along the blade longitudinal direction. With this configuration, even in cases where the wind turbine blade 2 is large in size along the blade longitudinal direction, disposing the plurality of protector members 30a, 30b, 30c, . . . along the blade longitudinal direction can construct a leading edge protector 30 that covers the leading edge 20 over a wide range, and achieve sufficient erosion resistance performance and lightning resistance performance.

The plurality of protector members 30a, 30b, 30c, . . . that constitute the leading edge protector 30 may be electrically connected to each other. In FIG. 4, the plurality of adjoining protector members 30a, 30b, 30c, . . . are electrically connected to each other by being joined via end portions having a complementary shape to each other. For example, the protector member 30a adjoining the protector member 30b has an end portion 31 having a partially notched cross-sectional shape on the upper layer side so as to have a partially decreased thickness. The end portion 31 is configured to be engageable with respect to the end portion 33 of the protector member 30b, where the end portion 33 has a partially notched cross-sectional shape on the lower layer side so as to have a partially decreased thickness.

Note that the shapes of the end portions 31 and 33 illustrated in FIG. 4 are merely examples and the end portions 31 and 33 may have other shapes. For example, the end portions 31 and 33 may have tapered angled surfaces that face each other.

In this manner, because the plurality of protector members 30a, 30b, 30c, . . . that constitute the leading edge protector 30 are electrically connected to each other, even when any of the protector members 30a, 30b, 30c, . . . is struck by lightning, the lightning current generated in the leading edge protector 30 can be accurately directed to the down conductor 15 or the conductive mesh member 17. As a result, even in a wind turbine blade 2 that is large in size along the blade longitudinal direction, good lightning resistance performance is achieved while preventing erosion damage.

As illustrated in FIG. 4, the plurality of protective members 30a, 30b, 30c, . . . are electrically connected via a conductive plate 35 provided between the plurality of protector members 30a, 30b, 30c, . . . , and the skin (suction-side skin 24). In this way, the contact resistance between the plurality of protector members 30a, 30b, 30c, . . . is reduced, which makes it possible to keep the electrical resistance value of the leading edge protector 30 low and improve lightning resistance performance.

Note that in cases where the plurality of protector members 30a, 30b, 30c, . . . are not directly connected to each other, the adjoining protector members 30a, 30b, 30c, . . . may be configured to be electrically connected with each other via the conductive plate 35.

In addition, in cases where the plurality of protector members 30a, 30b, 30c, . . . constitute the leading edge protector 30, a protector member closest to the blade root 12 of the blade main body 18 may be electrically connected to at least one of the down conductor 15 and the conductive mesh member 17. In the example of FIG. 4, among the plurality of protector members 30a, 30b, 30c, . . . that are electrically connected to each other, a protector member 30d closest to the blade root 12 is electrically connected to the down conductor 15 and the conductive mesh member 17 via the receptor 32.

With this configuration, when a wind turbine blade 2 is struck by lightning, the lightning current generated in each of the protector members 30a, 30b, 30c, . . . is directed to the protector member 30d closest to the blade root 12 before an electrical path directing the lightning current to the protector 15 and the conductive mesh member 17 is formed. Such a lightning resistant structure is simpler in construction than a configuration where each of the protector members 30a, 30b, 30c, . . . is electrically connected to the down conductor 15 or the conductive mesh member 17, respectively, and achieves excellent lightning resistance performance.

Note that in FIG. 4, because the down conductor 15 and the conductive mesh member 17 overlap at the position of the protector member 30d closest to the blade root 12 of the leading edge protector 30, the protector member 30d is electrically connected to the down conductor 15 and the conductive mesh member 17 via the receptor 32. Therefore, for example, in cases where the down conductor 15 and the conductive mesh member 17 are configured to overlap a different protector member, the different protector member may be electrically connected to the down conductor 15 and the conductive mesh member 17 via the receptor 32.

As described above, the wind turbine blade 2 according to the above-described embodiment includes the leading edge protector 30 that is electrically connected to the down conductor 15 or the conductive mesh member 17 via the receptor 32, which makes it possible to achieve good erosion resistance performance and lightning resistance performance. Such a configuration has little impact on the basic design and manufacturing processes of the wind turbine blades 2 because it can be realized using existing receptors conventionally included in the wind turbine blades 2.

Figure 5:
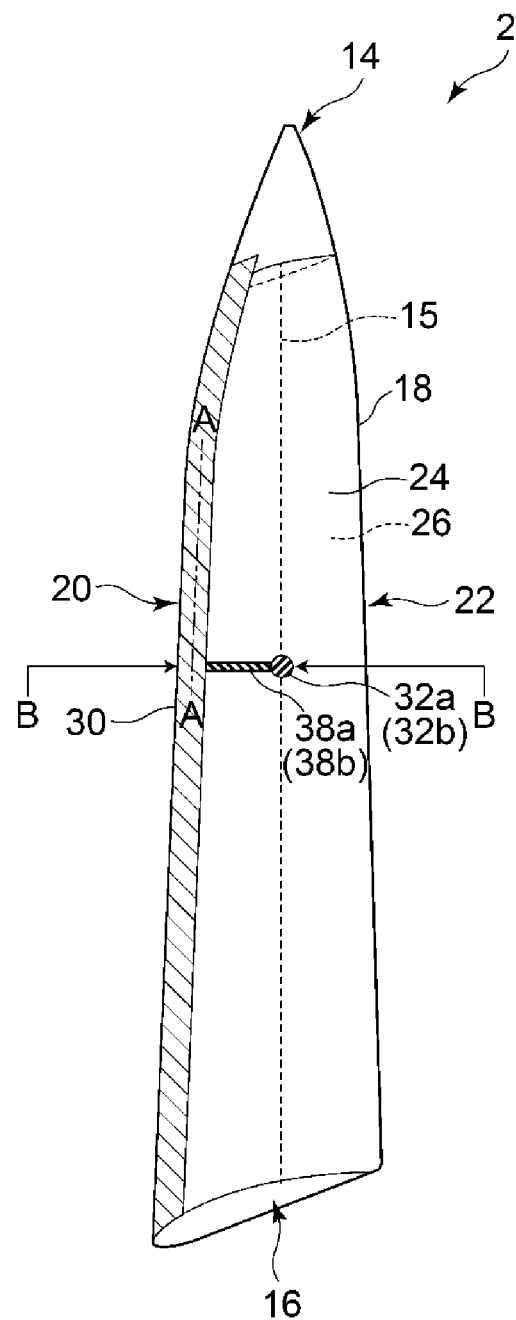
FIG. 5 is a perspective view illustrating a blade tip side of a wind turbine blade according to another embodiment.
Figure 6:
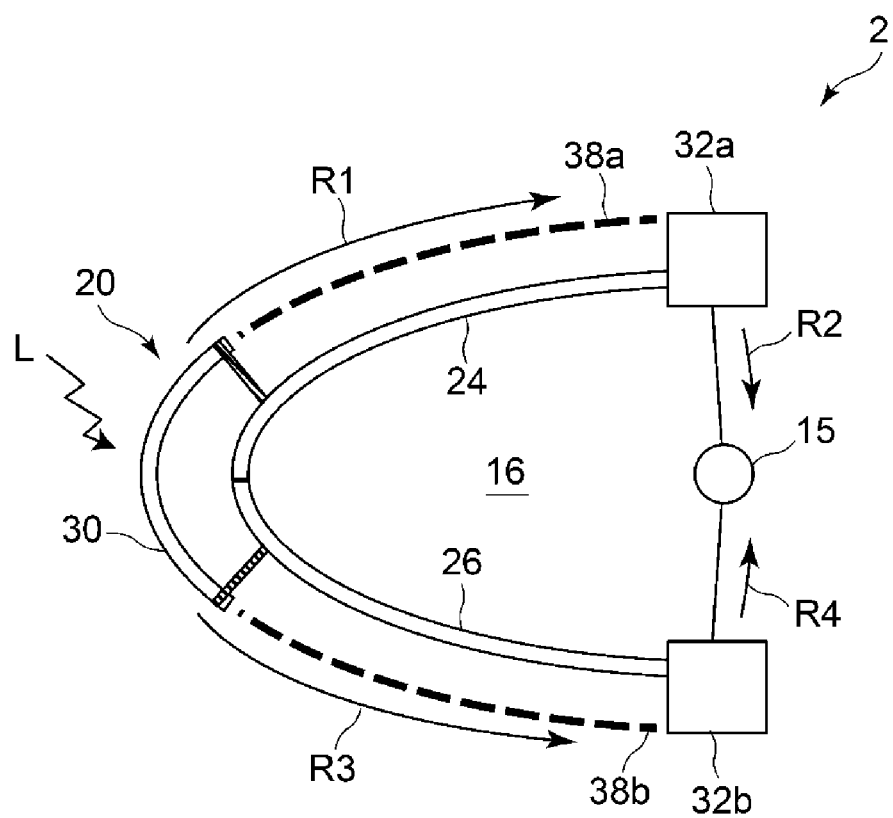

Next, a wind turbine blade 2 according to another embodiment will be described. FIG. 5 is a perspective view illustrating a blade tip 14 side of a wind turbine blade 2 according to another embodiment. FIG. 6 is a schematic cross-sectional view taken along the line B-B in FIG. 5. Here, in order to clearly illustrate the electrical connection status between each of the members that constitute the wind turbine blade 2, FIG. 6 illustrates the positional relationship between each of the members in a simplified manner.

Note that in the description that follows, common reference signs will be used for configurations corresponding to the aforementioned embodiment, with redundant description omitted as appropriate.

As illustrated in FIG. 5, in the present embodiment, a receptor 32a provided on the suction-side skin 24 is disposed at a position separated from the leading edge protector 30 when viewed from a direction perpendicular to the outer surface of the suction-side skin 24 (a receptor 32b (see FIG. 6) is also disposed at substantially the same position on the pressure-side skin 26). Furthermore, as illustrated in FIG. 6, the receptors 32a and 32b are electrically connected to the leading edge protector 30 via diverter strips 38a and 38b provided along the outer surfaces of the suction-side skin 24 and the pressure-side skin 26, respectively. In this manner, even in cases where the leading edge protector 30 and the receptors 32a and 32b are disposed in a separated manner, it is possible to guide the lightning current generated by a lightning strike to the leading edge protector 30 to the receptors via the diverter strips 38a and 38b, which allows physical damage to the leading edge protector 30 when hit by lightning to be reduced and lightning resistance performance to be improved.

In such a lightning resistant configuration, as illustrated in FIG. 6, the leading edge protector 30 and the receptor 32 are connected in parallel by the diverter strips 38a and 38b disposed on the suction side and pressure side of the blade main body 18. In cases where the leading edge 20 is subjected to a lightning strike L, the lightning current generated by the lightning strike L is directed on the suction side by way of a route R1 along the suction-side skin 24 from the leading edge protector 30 toward the receptor 32a and a route R2 from the receptor 32a toward the down conductor 15, and is directed on the pressure side by way of a route R3 along the pressure-side skin 26 from the leading edge protector 30 toward the receptor 32b and a route R4 from the receptor 32b toward the down conductor 15. In this way, physical damage to the leading edge protector 30 when hit by lightning can be further reduced and lightning resistance performance can be improved.

As described above, in the wind turbine blade 2 according to the above-described embodiment, even in cases where the leading edge protector 30 is disposed separated from the receptor 32, good lightning resistance performance can be achieved by guiding the lightning current generated by lightning striking the leading edge protector 30 by the diverter strip 38 to the receptor 32.

Figure 7:
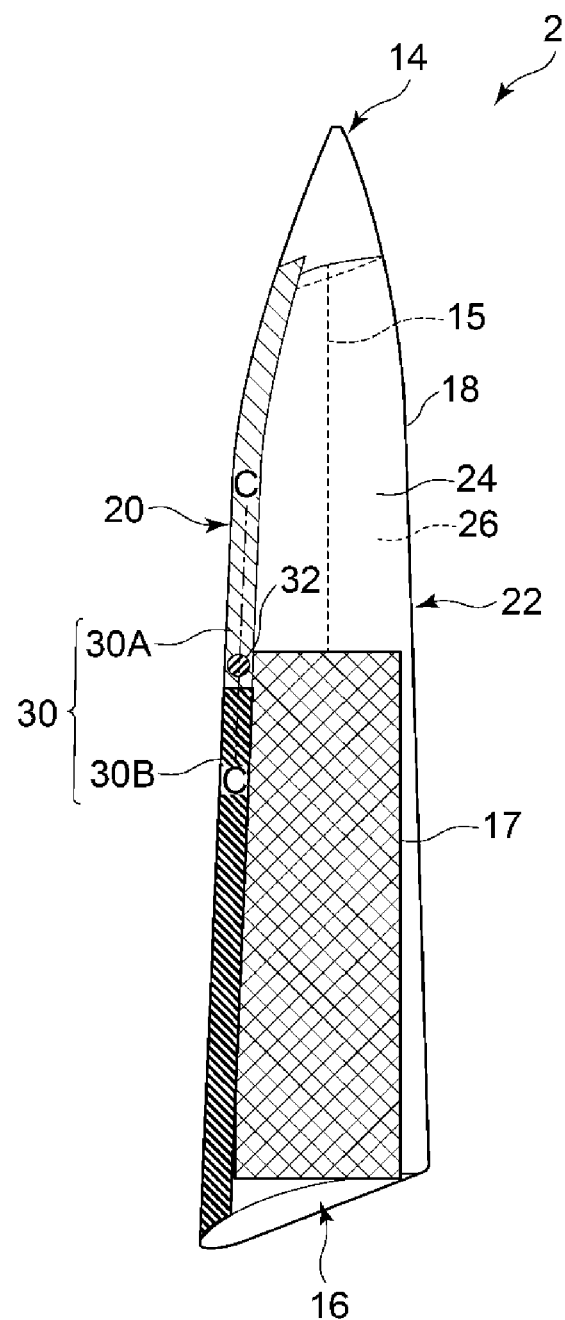
FIG. 7 is a perspective view illustrating a blade tip side of a wind turbine blade according to another embodiment.
Figure 8:
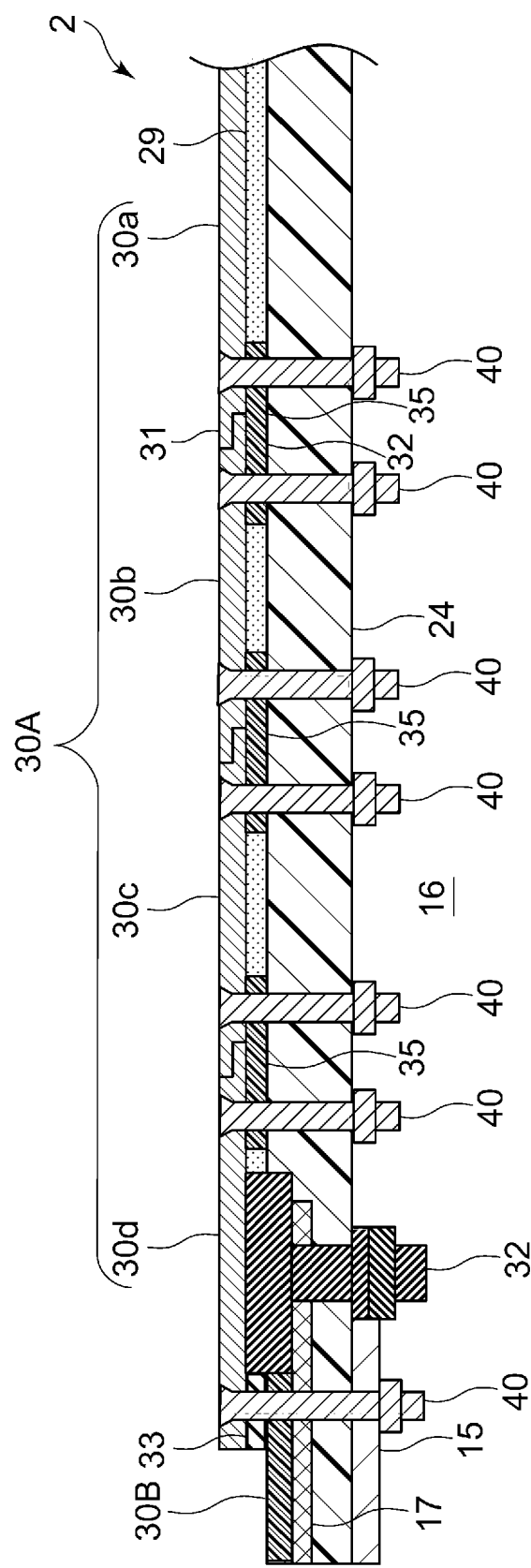
FIG. 8 is a cross-sectional view of a vicinity of a suction-side skin taken along the line C-C in FIG. 7.

Next, a wind turbine blade 2 according to another embodiment will be described. FIG. 7 is a perspective view illustrating a blade tip 14 side of a wind turbine blade 2 according to another embodiment. FIG. 8 is a cross-sectional view of a vicinity of a suction-side skin 24 taken along the line C-C in FIG. 7.

Note that in the description that follows, common reference signs will be used for configurations corresponding to the aforementioned embodiments, with redundant description omitted as appropriate.

As illustrated in FIG. 7, the leading edge protector 30 provided so as to cover the leading edge 20 of the blade main body 18 includes a first region 30A and a second region 30B. The first region 30A is constructed of a metal board, similar to the leading edge protector 30 of each of the aforementioned embodiments. The second region 30B is constructed of a thermal spray film, and is provided closer to the blade root 12 side of the blade main body 18 than the first region 30A. The first region 30A and the second region 30B are disposed along the blade longitudinal direction and are electrically connected to each other. In this manner, the leading edge protector 30 has a hybrid structure that includes the first region 30A and the second region 30B having different forms. In general, because thermal spray films can be formed thinner than boards, having such a hybrid structure can lessen the weight of the leading edge protector 30 while ensuring lightning resistance performance.

In addition, the first region 30A constructed of a metal board is disposed closer to the blade tip 14 side, which is likely to be directly struck by lightning, compared to the second regions 30B, thereby making it possible to prevent the leading edge protector from being damaged by lightning. Furthermore, because the second region 30B is constructed of a thermal spray film, which easily reduces the potential difference between the second region 30B and the conductive mesh member 17 and is less prone to cause sparks, the second region 30B being disposed closer to the blade root 12 side than the first region 30A allows the lightning current from the first region 30A to be suitably directed to the conductive mesh member 17.

In addition, the leading edge protector 30 may be fixed to the blade main body with a bolt member 40 that passes through the skin. In the present embodiment, as illustrated in FIG. 8, each of the plurality of protector members 30a, 30b, 30c, ... that constitute the leading edge protector 30 are fixed to the suction-side skin 24 that constitutes the blade main body 18 with the bolt member 40 at the vicinities of both ends along the blade longitudinal direction, respectively. Adopting such a fixing structure that uses the bolt members 40 can keep the risk of the leading edge protector 30 falling off from the blade main body 18 low, and realize a wind turbine blade 2 having a highly reliable configuration.

Note that the bolt members 40 are provided so as to pass through the conductive plates 35 disposed between the adjoining protector members 30a, 30b, 30c, ... that constitute the leading edge protector 30. In this way, electrical connection between the plurality of protective members 30a, 30b, 30c, ... can be reinforced together with the conductive plates 35.

Note that the first region 30A and the second region 30B are electrically connected via a connection plate 33 made from a conductive material, as illustrated in FIG. 8. In this manner, providing the connection plate 33 can ensure electrical connection between the first region 30A and the second region 30B even in areas where the receptor 32 is not present.

As described above, the wind turbine blade 2 according to the above-described embodiment has a hybrid structure that includes the first region 30A and the second region 30B. This makes it possible to effectively mitigate the risk of the leading edge protector 30 falling off by making the configuration light in weight while ensuring good lightning resistance performance. Furthermore, in the wind turbine 1 including the wind turbine blade 2 according to each of the aforementioned embodiments, erosion damage to the wind turbine blade 2 is prevented, thereby making it possible to reduce the burden of maintenance and achieve excellent lightning resistance performance.

In addition, it is possible to replace the components in the above-described embodiments with well-known components as appropriate without departing from the spirit of the disclosure, and the above-described embodiments may be combined as appropriate.

The details described in each embodiment can be understood as follows, for example.

(1) A wind turbine blade according to one aspect (e.g., a wind turbine blade 2 of the above-described embodiments) includes a blade main body (e.g., a blade main body 18 of the above-described embodiments); and a leading edge protector (e.g., a leading edge protector 30 of the above-described embodiments) including a conductive material, the leading edge protector covering a leading edge (e.g., a leading edge 20 of the above-described embodiments) of the blade main body, and the leading edge protector being electrically connected to at least one of a down conductor (e.g., a down conductor 15 of the above-described embodiments) disposed in a hollow space (e.g., a hollow space 16 of the above-described embodiments) enclosed by a skin in the blade main body and a conductive mesh member (e.g., a conductive mesh member 17 of the above-described embodiments) provided along an outer surface of the skin.

According to the aspect of (1) above, a leading edge protector provided to cover the leading edge so as to prevent erosion damage to the blade main body includes a conductive material. Furthermore, the leading edge protector is electrically connected to at least one of the down conductor and the conductive mesh member, thereby making it possible to direct the lightning current to the down conductor or the conductive mesh member in cases where the leading edge protector is struck by lightning. With the wind turbine blade having such a configuration, good lightning resistance performance can be achieved while preventing erosion damage.

(2) In another aspect, in the aspect of (1) above, the leading edge protector is electrically connected to at least one of the down conductor and the conductive mesh member via a receptor (e.g., a receptor 32 of the above-described embodiments) provided on the skin so as to extend from the outer surface along a thickness direction of the skin.

According to the aspect of (2) above, the leading edge protector is electrically connected to at least one of the down conductor and the conductive mesh member via a receptor provided on the blade main body. In the skin that constitutes the blade main body, the receptor is provided so as to extend from the outer surface in the thickness direction of the skin, which makes it possible to electrically connect, in an efficient layout, the leading edge protector to the down conductor or the conductive mesh member provided at different positions along the thickness direction.

(3) In another aspect, in the aspect of (1) or (2) above, the leading edge protector includes a plurality of protector members (e.g., protector members 30a, 30b, 30c, . . . of the above-described embodiments) disposed along the blade longitudinal direction of the blade main body.

According to the aspect of (3) above, the leading edge protector covering the leading edge of the blade main body is constituted by a plurality of protector members disposed along the blade longitudinal direction of the blade main body. With this configuration, even in cases where the wind turbine blade is large in size along the blade longitudinal direction, disposing the plurality of protector members along the blade longitudinal direction makes it possible to construct a leading edge protector that covers the leading edge over a wide range.

(4) In another aspect, in the aspect of (3) above, the plurality of protector members are electrically connected to each other.

According to the aspect of (4) above, the plurality of protector members that constitute the leading edge protector are electrically connected to each other. With this configuration, even when any of the protective members is struck by lightning, the lightning current generated in the leading edge protector can be accurately directed to the down conductor or the conductive mesh member. As a result, even in a wind turbine blade that is large in size along the blade longitudinal direction, good lightning resistance performance is achieved while preventing erosion damage.

(5) In another aspect, in the aspect of (4) above, the plurality of protector members are electrically connected via a conductive plate (e.g., a conductive plate 35 of the above-described embodiments) provided between the plurality of protective members and the skin.

According to the aspect of (5) above, the plurality of protector members that constitute the leading edge protector are electrically connected via a conductive plate. In this way, electrical connection between the plurality of protector members can be favorably ensured and lightning resistance performance can be improved. For example, even in cases where adjoining protector members are not directly connected to each other, these members can be electrically connected via a conductive plate. In addition, even in cases where adjoining protector members are directly connected to each other, the electrical resistance values at connections between these members can be reduced.

(6) In another aspect, in the aspect of (4) or (5) above, a protector member (e.g., a protector member 30d of the above-described embodiments) closest to the blade root of the blade main body among the plurality of protector members is electrically connected to at least one of the down conductor and the conductive mesh member.

According to the aspect of (6) above, among the plurality of protector members that are electrically connected to each other, a protector member closest to the blade root is electrically connected to at least one of the down conductor and the conductive mesh member. The lightning current generated at each of the protector members that constitute the leading edge protector is directed to the protector member closest to the blade root before being directed to at least one of the down conductor and the conductive mesh member. In this way, lightning resistance performance can be improved with a simple configuration compared to a configuration where each protector member is electrically connected to at least one of the down conductor and the conductive mesh member.

(7) In another aspect, in the aspect of (1) above, the leading edge protector is electrically connected, via a diverter strip (e.g., diverter strips 38a and 38b of the above-described embodiments) provided along the outer surface, to a receptor provided on the outer surface at a position separated from the leading edge protector, the receptor being electrically connected to the down conductor.

According to the aspect of (7) above, the leading edge protector is electrically connected via a diverter strip to a receptor provided on the outer surface of the blade main body at a position separated from the leading edge protector. In this way, even in cases where the leading edge protector and the receptor are disposed in a separated manner, electrically connecting the leading edge protector and the receptor via a diverter strip makes it possible to, when a wind turbine blade is struck by lightning, effectively keep the wind turbine blade from being damaged due to discharge caused by the potential difference between the receptor and the leading edge protector.

(8) In another aspect, in any one of the aspects (1) to (7) above, the leading edge protector includes a first region (e.g., a first region 30A of the above-described embodiments) constructed of a metal board; and a second region (e.g., a second region 30B of the above-described embodiments) provided more to a blade root side of the blade main body than the first region and constructed of a thermal spray film.

According to the aspect of (8) above, the leading edge protector includes a first region constructed of a metal board and a second region constructed of a thermal spray film. With this configuration, the weight can be reduced compared to a configuration where the entire leading edge protector is constructed of a metal board.

In addition, the first region constructed of a metal board is disposed closer to the blade tip side, which is likely to be directly struck by lightning, compared to the second region, thereby making it possible to prevent the leading edge protector from being damaged by lightning strike. Furthermore, because the second region is constructed of a thermal spray film, which easily reduces the potential difference between the second region and the conductive mesh member and is less prone to cause sparks, the second region being disposed closer to the blade root side than the first region allows the lightning current from the first region to be suitably directed to the conductive mesh member.

In this manner, with the leading edge protector having a hybrid structure that includes the first region and the second region, excellent lightning resistance performance is achieved.

(9) In another aspect, in any one of the aspects (1) to (8) above, the leading edge protector is fixed to the blade main body with a bolt member (e.g., a bolt member 40 of the above-described embodiments) that passes through the skin.

According to the aspect of (9) above, the leading edge protector is fixed to the blade main body with a bolt member that passes through the skin. This configuration results in a highly reliable configuration in which the risk of the leading edge protector falling off from the blade main body is low.

(10) A wind turbine according to one aspect (e.g., a wind turbine 1 of the above-described embodiments) includes the wind turbine blade according to any one of the aspects (1) to (9) above.

According to the aspect of (10) above, because the wind turbine blade having the above-described configuration is included, erosion damage to the wind turbine blade is prevented, thereby making it possible to realize a wind turbine that has low burden of maintenance and excellent lightning resistance performance.

While preferred embodiments of the invention have been described as above, it is to be understood that variations and modifications will be apparent to those skilled in the art without departing from the scope and spirit of the invention. The scope of the invention, therefore, is to be determined solely by the following claims.

What is claimed is:

1. A wind turbine blade, comprising:
  a blade main body; and
  a leading edge protector including a conductive material, the leading edge protector covering a leading edge of the blade main body, and being electrically connected to a down conductor in a hollow space enclosed by a skin in the blade main body;
  a first receptor electrically connected to the down conductor and provided on an outer surface of the skin at a first position separated from the leading edge protector;
  a second receptor electrically connected to the down conductor and provided on the outer surface of the skin at a second position separated from the leading edge protector;
  a first diverter strip; and
  a second diverter strip,
  wherein:
  the leading edge protector, the first receptor and the second receptor are connected in parallel by the first diverter strip on a suction side of the blade main body and the second diverter strip on a pressure side of the blade main body such that lightning current generated by a lightning strike is directed on the suction side along a first route along the skin on the suction side from the leading edge protector toward the first receptor and a second route from the first receptor toward the down conductor, and is directed on the pressure side along a third route along the skin on the pressure side from the leading edge protector toward the second receptor and a fourth route from the second receptor toward the down conductor.

2. The wind turbine blade according to claim 1, wherein the leading edge protector includes a plurality of protector members disposed along a blade longitudinal direction of the blade main body.

3. The wind turbine blade according to claim 2, wherein the plurality of protector members are electrically connected to each other.

4. The wind turbine blade according to claim 3, wherein the plurality of protector members are electrically connected via a conductive plate provided between the plurality of protector members and the skin.

5. The wind turbine blade according to claim 3, wherein a protector member closest to a blade root of the blade main body among the plurality of protector members is electrically connected to the down conductor.

6. The wind turbine blade according to claim 1, wherein the leading edge protector includes:
  a first region constructed of a metal board; and
  a second region provided closer to a blade root side of the blade main body than the first region and constructed of a thermal spray film.

7. The wind turbine blade according to claim 1, wherein the leading edge protector is fixed to the blade main body with a bolt member that passes through the skin.

8. A wind turbine comprising the wind turbine blade according to claim 1.

9. The wind turbine blade according to claim 1, wherein the leading edge protector is electrically connected to a conductive mesh member provided along the outer surface of the skin.

* * * * *